July 30, 1940.  G. N. ESSEX ET AL  2,209,945
INSECT TRAP
Filed Oct. 31, 1938
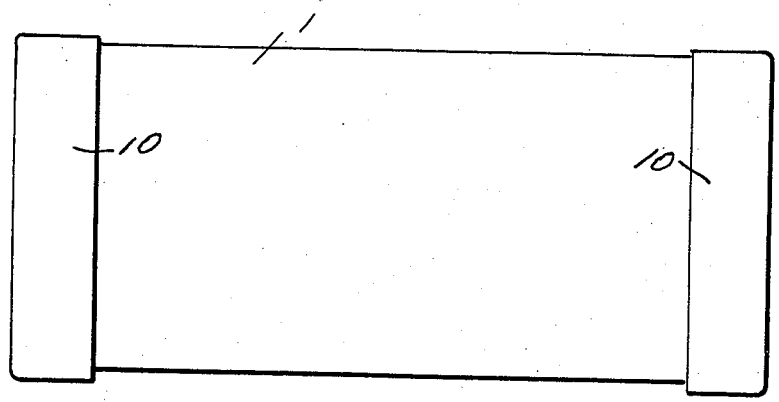
FIG-1-
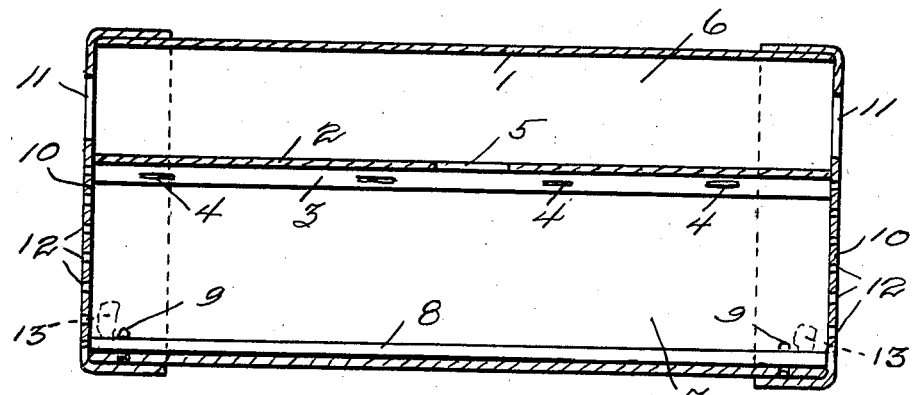
FIG-2-
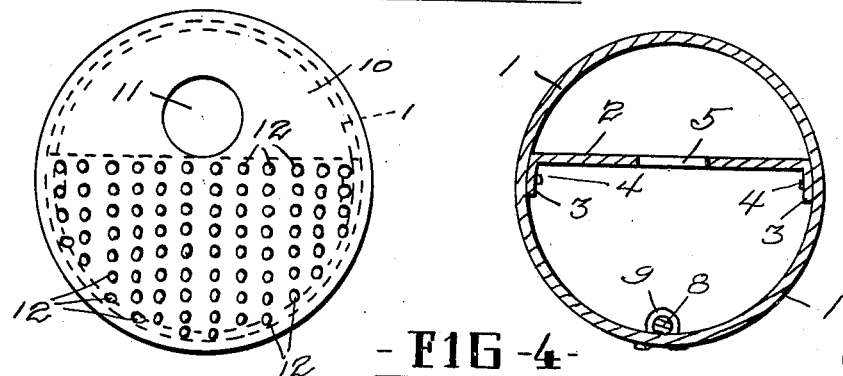
FIG-3-  FIG-4-
INVENTORS
GUY N. ESSEX, &
J. R. MC CARTY
BY
ATTORNEY Patented July 30, 1940

2,209,945

UNITED STATES PATENT OFFICE 2,209,945

INSECT TRAP

Guy N. Essex and James R. McCarty, Bloomington, Ill.

Application October 31, 1938, Serial No. 238,002

3 Claims. (Cl. 43—121)

Our invention, in its broad aspect, has to do with improvements in so-called live traps, i. e. traps for insects which confine the same alive after they have entered the trap under the alture of bait, until they are removed, killed, and disposed of. The trap is then again set for another catch. Our trap has a number of unique and advantageous features not believed found or suggested in other traps in the same general class, and its structure and arrangement has been greatly simplified, rendered more efficient, and more desirable and practical for the purposes intended. In practice it is merely necessary to set the trap with bait in a place where insects are likely to be found.

A trap, in order to be effective, must be structurally adapted to the peculiarities of the insects it is designed to kill. Our trap is particularly adapted for use in catching house cock roaches, croton bugs and the so-called Australian water bug, which is the large cock roach with wings. It must be understood that roaches will eat almost anything, even to glue so that a trap to be most effective must be set up without glue. Also the female roach carries eggs in an egg sack or purse, and in order to be effective as a roach eradicator it is necessary to destroy the egg purse. Therefore ordinary poisons and the like leave much to be desired since after killing the roaches, the egg purses and contents are in no wise damaged so that when the dead roaches are swept up and thrown out the eggs hatch and a new crop is produced, and those roaches which are not swept up—those hiding around base boards and the like in a room, simply die and the eggs hatch in the usual course rendering methods of eradication by poison and the like largely ineffective. Neither do traps which are intricate and complicated serve the purpose since they defeat the very ends for which a trap is constructed, i. e. expeditious handling and setting, ready cleaning, and expense. A trap must also be constructed with sanitation in view since roaches once caught or killed cannot be permitted to remain about the house, and the trap itself must be kept in a sanitary condition. Furthermore a trap of this nature must be constructed to sell at a relatively small price, and at the same time be durable and practical.

With these and other ends in view we have constructed a trap which permits easy access or entrance of roaches, and which is designed to prevent escape of the trapped insects, and which is designed to attract insects, be readily cleaned, and readily evacuated of trapped insects, and which is simple and practical in construction.

Other and equally important objects and advantages of our invention may be briefly defind as follows (1) the trap is formed of but five very simply formed parts, i. e. the two slip covers which are metal stampings, the platform, the counterweight, and the cylindrical fibre tube body; thus manufacture is cheap and operation simple and practical (2) the two slip covers are simple metal castings and are formed with holes to serve three purposes, i. e. to form a ladder for roaches to enter the main entrance opening, to provide means at both ends of the trap whereby they will smell the bait, and to provide means whereby roaches caught in the trap will run to the ends and become confused in seeking escape so that they will not attempt to get out of the trap, (3) our platform is arranged in the trap to divide it into two compartments, and the opening in the platform is so formed and arranged that roaches in the trap cannot pass out through the opening and escape since in order to crawl out of the opening a roach must grasp the edge of the hole with its front legs and release its hold by the back legs with the result that the body swings down at the back and the weight of the body being too much for the front legs to carry causes the roach to fall back in the trap, (4) the slip covers have a friction fit on the fibre tube body to be quickly removable to remove the contents and clean the trap, (5) no glue is used so that roaches cannot eat the glue and cause the trap to fall apart, (6) the platform serves to reinforce the fibre tube body, and (7) the counterweight is placed to keep the trap in an upright, operative position.

Having described some of the objects and advantages of our invention, it is pointed out that additional advantages will be apparent as the detailed description and drawing are referred to, but it is to be noted that we reserve the right to make changes in form, size, shape, material and arrangements of parts, and that the scope of our invention is only to be determined by reference to the claims.

In the drawing wherein we have shown a preferred form of our invention:

Figure 1 is a side view of the same,

Figure 2 is a sectional view taken on the longitudinal center line of the trap,

Figure 3 is an end view, and

Figure 4 is a transverse section.

In the drawing, wherein like characters of reference are used to designate like or similar parts:

The numeral 1 designates a cylindrical body formed of paper or fibre board, and within which is a platform 2 having flanged edges 3 through which staples 4 are engaged to attach the platform to the body at a point slightly above the center line as shown in Figure 4. Substantially midway the ends and sides of the platform is an entrance hole or opening 5. The platform divides the cylindrical body into an upper or entrance compartment 6 and a lower or trapping compartment 7; compartment 7 being larger than compartment 6.

On the bottom of the trapping compartment 7 is a metal rod 8 which functions as a counterweight to hold the body in a proper position, and the counterweight is attached by clips 9. The open ends of the body are closed by sheet metal slip covers 10, which have a friction grip on the body to hold them in engagement therewith. The slip covers 10 have a large entrance opening or hole 11 which ordinarily is arranged slightly above the platform 2 when the trap is set up, and below the opening 11 is a series of openings or holes 12 which are ordinarily below the platform when the trap is set up. Roaches climb up the slip covers by grasping the edges of holes 12 and enter the hole or opening 11 in search of bait indicated by dotted lines at 13 in each end of the trapping compartment; upon entering the opening 11 they follow the platform and climb down through the opening 5 therein to enter the lower compartment where they are trapped. Escape is prevented both for the reason that it is almost impossible for roaches to climb back through opening 5 for reasons hereinbefore given, and because they become too much confused and tend to congregate at the ends of the trap near the holes 12 where light and air are obtainable. When the trap has been set up over night for instance, one slip cover or both is removed and the contents dumped into the fire or in a pail of hot water to kill both the roaches and the eggs in the egg purses of the females. The trap is then ready for more bait and another catch.

It is believed that the operation and advantages of our invention are apparent from the foregoing, and emphasis is again placed on the fact that interpretation of the scope of our invention should only be conclusive in the light of the claims.

We claim:

1. An insect trap comprising an elongated cylindrical, one-piece body portion having open ends, a partitioning member attached to the walls of the body dividing the same into compartments, said partitioning member formed with an opening centrally located between its ends, removable covers for the open ends of the body frictionally engaging the same, each of said covers being formed with a single entrance opening leading to one compartment, and a series of small holes opening into the other compartment, and a counterweight at the bottom of said latter compartment to retain the trap in a predetermined position with the first compartment uppermost.

2. An insect trap comprising an elongated, hollow body with open ends, a platform arranged longitudinally of the body and dividing the same into upper and lower compartments, the lower compartment being larger than the upper compartment, a counterweighting device in the lower compartment of the body, frictionally engaged covers over the open ends of the body and each being formed with a large hole leading into the upper and smaller compartment and a series of small holes opening into the lower and larger compartment, and the platform having an opening arranged substantially midward its sides and ends leading from the upper to the lower compartment.

3. An insect trap comprising a hollow, cylindrical body formed with open ends, end covers for the body removably engaged therewith, a platform in the body and dividing the same into two compartments, said platform being formed with an opening substantially midway the sides and ends of the body giving access from one compartment to the other, a counterweighting device in the body designed to retain the same with one compartment located above the other, and the end covers being formed each with a single large opening leading into the upper compartment, and a plurality of small holes opening into the lower compartment.

GUY N. ESSEX.
JAMES R. McCARTY.